United States Patent [19]

Korenaga

[11] Patent Number: 5,222,468
[45] Date of Patent: Jun. 29, 1993

[54] ANTI-THEFT IGNITION CONTROL APPARATUS

[75] Inventor: Takaharu Korenaga, Himeji, Japan

[73] Assignee: Mitsubishi Denki Kabushiki Kaisha, Tokyo, Japan

[21] Appl. No.: 872,118

[22] Filed: Apr. 22, 1992

[30] Foreign Application Priority Data

Apr. 25, 1991 [JP] Japan ................... 3-095191
Apr. 25, 1991 [JP] Japan ................... 3-095192

[51] Int. Cl.$^5$ ............................................. F02B 77/00
[52] U.S. Cl. ................................ 123/198 B; 180/287
[58] Field of Search ................... 123/198 B; 180/287

[56] References Cited

U.S. PATENT DOCUMENTS 4,842,093  6/1989  Lerche et al. ................ 180/287

FOREIGN PATENT DOCUMENTS

2-41958  2/1990  Japan .
3-72067  7/1991  Japan .

Primary Examiner—Noah P. Kamen
Attorney, Agent, or Firm—Sughrue, Mion, Zinn, Macpeak and Seas

[57] ABSTRACT

An ignition apparatus for an engine includes an ignition switch and a monitor switch connected to a battery. A power supply circuit generates a reset signal for a microcomputer in response to closing of the ignition switch. A monitor signal generating circuit generates a monitor signal for the microcomputer in response to closing of the monitor switch. The microcomputer enables ignition to take place only if the monitor signal has a prescribed value when the reset signal is generated. The timing of the reset signal and the timing of the monitor signal are chosen so that the microcomputer will enable ignition only if the ignition switch and the monitor switch are closed substantially simultaneously and will prevent ignition when the switches are closed sequentially, such as when the switches are hot-wired.

6 Claims, 5 Drawing Sheets

ANTI-THEFT IGNITION CONTROL APPARATUS

BACKGROUND OF THE INVENTION

This invention relates to an ignition control apparatus for use with an internal combustion engine, such as an automotive engine. More particularly, it relates to an ignition control apparatus which can make theft of a vehicle equipped with the ignition control apparatus more difficult.

A typical automotive engine is started by means of an ignition switch operated with a key. However, it is possible to start an engine without using a key by short circuiting the ignition switch so as to connect the battery to the ignition coil and the starter. This method, known as hot-wiring, is employed for many auto thefts.

SUMMARY OF THE INVENTION

It is an object of the present invention to provide an ignition control apparatus for an internal combustion engine which makes it virtually impossible to hot-wire the engine.

An ignition control apparatus for an engine according to the present invention includes an ignition switch and a monitor switch connected to a battery. A power supply circuit generates a reset signal for a control means such as a microcomputer in response to closing of the ignition switch, and a monitor signal generating circuit generates a monitor signal for the control means in response to closing of the monitor switch. The control means controls an ignition coil for the engine so as to enable ignition to take place only if the monitor signal has a prescribed value when the reset signal is generated. The timing of the reset signal and the timing of the monitor signal are chosen so that the control means will enable ignition only if the ignition switch and the monitor switch are closed substantially simultaneously and will prevent ignition when the switches are closed sequentially, such as when an attempt is made to hot-wire the engine.

A control apparatus according to the present invention may also include a holding circuit for maintaining the monitor signal at a prescribed level if the ignition switch and the monitor switch are closed substantially simultaneously and allowing the monitor signal to return to a different level if the switches are closed sequentially. By maintaining the monitor signal at the prescribed level, the holding circuit prevents the control apparatus from stopping ignition of the engine when there is a momentary drop in the voltage of a battery for the engine.

DESCRIPTION OF THE PREFERRED EMBODIMENTS

Figure 1:
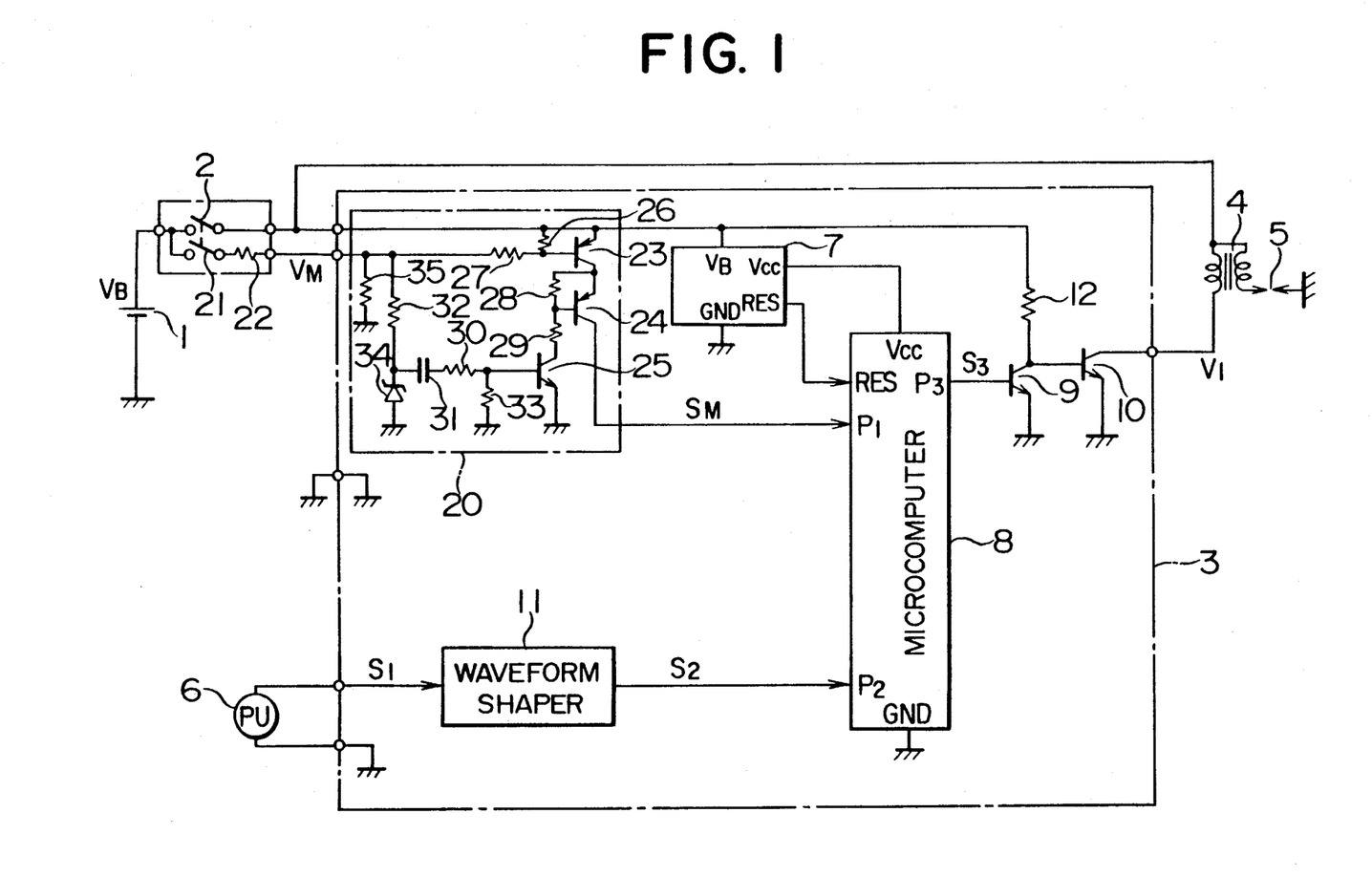
FIG. 1 is a circuit diagram of an embodiment of an ignition control apparatus according to the present invention.

A number of preferred embodiments of an ignition control apparatus according to the present invention will now be described while referring to the accompanying drawings. FIG. 1 is a circuit diagram of a first embodiment as applied to an unillustrated, multi-cylinder internal combustion engine. The number of cylinders in the engine and the type of vehicle on which the engine is mounted are not critical. For example, the present invention could be employed with an engine for an automobile, a boat, a motorcycle, or a farm vehicle. Furthermore, the engine need not be mounted on a vehicle, and could be used to power stationary equipment, such as an electrical generator. However, the illustrated embodiment will be explained for the case in which it is employed with an automotive vehicle.

The vehicle is equipped with a battery 1 having a voltage VB. The voltage is not critical, but in automobiles, it is generally on the order of 12-14 volts. The battery 1 supplies DC power to an ignition control unit 3 via a key-operated ignition switch 2. The ignition switch 2 has a first terminal connected to the battery 1 and a second terminal connected to the control unit 3 and to the primary winding of an ignition coil 4. The secondary winding of the ignition coil 4 is connected in a conventional manner to one or more spark plugs 5, only one of which is illustrated. A monitor switch 21 is mechanically coupled to the ignition switch 2 so as to open an close in synchrony with the ignition switch 2. One terminal of the monitor switch 21 is connected to the battery 1 and another terminal is connected to the control unit 3 through a resistor 22.

A pickup 6 senses the rotation of a member which rotates in synchrony with the engine and generates an output signal S1 identifying the rotational angle of the crankshaft of the engine. Pickups of this type are well-known in the art, and any suitable type can be employed, such as one which senses the rotation of the crankshaft or the camshaft of the engine, or one which senses the rotation of a distributor associated with the engine. The output signal S1 of the pickup 6 is provided to the control unit 3.

The control unit 3 includes a power supply circuit 7, a microcomputer 8 that controls the operation of the control unit 3, a drive transistor 9 and a power transistor 10 for controlling the primary current of the ignition coil, a waveform shaping circuit 11, and a monitor signal generating circuit 20. The power supply circuit 7 has a power supply terminal VB which is connected to the battery 1 through the ignition switch 2 and to the collector of the drive transistor 9 through a resistor 12. The power supply circuit 7 provides the microcomputer 8 with a constant voltage VCC, such as 5 volts, and a reset signal RES which causes the microcomputer 8 to start running a program. The reset signal RES is generated a prescribed length of time TR after the battery voltage VB is applied to the power supply circuit 7. The microcomputer 8 has input ports P1 and P2 and an output port P3. Input port P1 is connected to the monitor signal generating circuit 20, input port P2 is connected to the waveform shaping circuit 11, and output port P3 is connected to the base of the drive transistor 9 and provides the drive transistor 9 with a switching signal S3 which turns the drive transistor 9 on and off. The emitters of transistors 9 and 10 are grounded, and the collector of transistor 10 is connected to the primary winding of the ignition coil 4. The output signal S1 of the pickup 6 is provided to the waveform shaping circuit 11, which provides a shaped output signal S2 to input port P2 of the microcomputer 8.

The monitor signal generating circuit 20, which includes elements 23–35, is connected to the battery 1 via the monitor switch 21 and resistor 22. The emitter of a transistor 23 is connected to one terminal of the ignition switch 2 and to resistor 22 through resistors 26 and 27. The collector of transistor 23 is connected to the emitter of another transistor 24 and to the base of transistor 24 through a resistor 28. The collector of transistor 24 is connected to input port P1 of the microcomputer 8 and its base is connected to the collector of another transistor 25 through a resistor 29. The voltage at the collector of transistor 24 will be referred to as a monitor signal SM. The emitter of transistor 25 is grounded, and its base is connected to resistor 22 through a resistor 30, a capacitor 31, and a resistor 32. A resistor 33 is connected between the base of transistor 25 and ground, and a Zener diode 34 is connected between ground and the junction of capacitor 31 and resistor 32. A resistor 35 is connected between resistor 22 and ground.

The microcomputer 8 determines whether to enable operation of the ignition coil 4 based on the level of the monitor signal SM at the time that the reset signal RES is generated. The structure of the monitor signal generating circuit 20 is such that when the ignition switch 2 and the monitor switch 21 have been closed in the normal manner, i.e., substantially simultaneously by use of a key, then the monitor signal SM will have a high level when the reset signal RES is generated. On the other hand, if there is more than a prescribed length of time between the closing of the ignition switch 2 and the closing of the monitor switch 21, then the switches are not being closed by means of a key. In this case, the monitor signal generating circuit 20 is in structured such that the monitor signal SM has a low level when the reset signal RES is generated. Therefore, if the microcomputer 8 determines that the monitor signal SM has a high level when the reset signal RES is generated, the microcomputer 8 controls the switching signal S3 to switch between a high level and a low level in response to changes in input signal S2, thereby allowing ignition to take place. On the other hand, if the microcomputer 8 determines that the monitor signal SM has a low level when the reset signal SM is generated, the microcomputer 8 maintains the switching signal S3 at a high level, regardless of the level of input signal S2, and ignition of the engine is thereby prevented.

Figure 2:
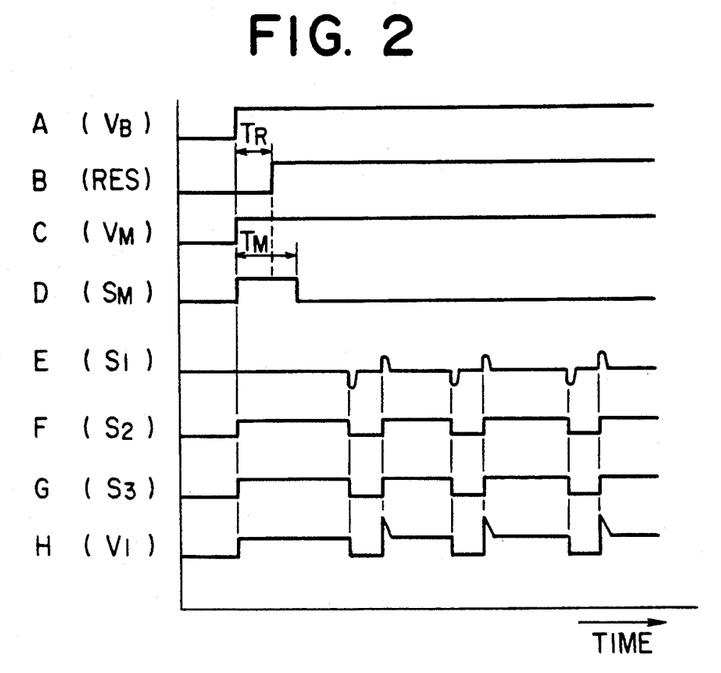
FIGS. 2-4 are waveform diagrams illustrating the operation of the embodiment of FIG. 1.
Figure 3:
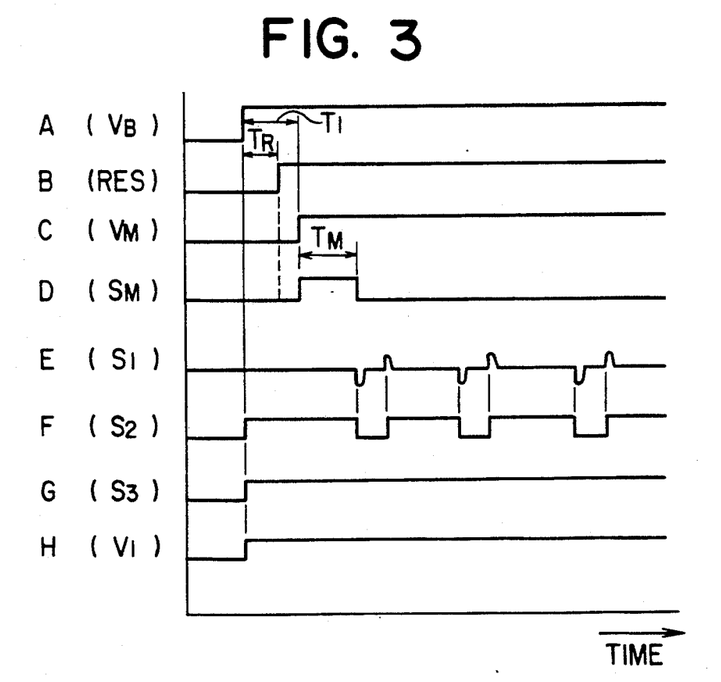
Figure 4:
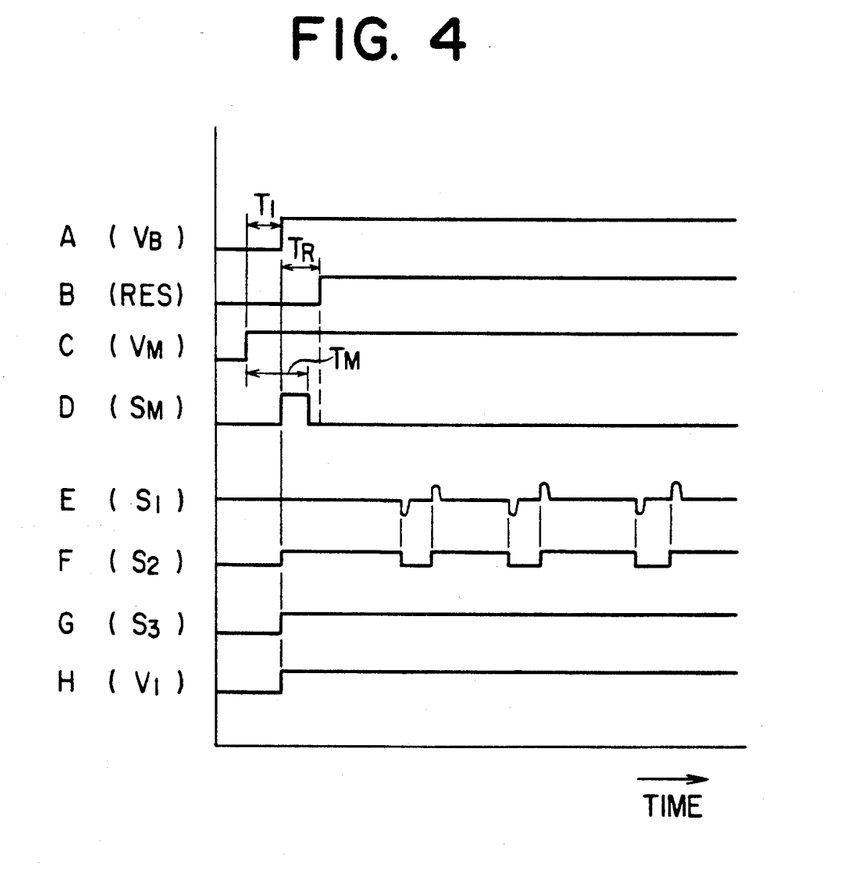

The operation of the embodiment of FIG. 1 will be explained in greater detail while referring to FIGS. 2–4. FIG. 2 is a waveform diagram illustrating operation of the embodiment when the ignition switch 2 is closed in the normal manner, i.e., by use of a key. When the ignition switch 2 is closed, the battery voltage VB shown by line A of FIG. 2 is supplied to the power supply circuit 7 and to the collector of the drive transistor 9 through resistor 12. The battery voltage VB is also supplied to the emitter of transistor 23 of the monitor signal generating circuit 20. The power supply circuit 7 supplies a constant voltage VCC to the microcomputer 8, and it also provides the microcomputer 8 with a reset signal RES, as shown by line B of FIG. 2, that rises a prescribed length of time TR after the battery voltage VB is applied to the power supply circuit 7. Upon receiving the reset signal RES, the microcomputer 8 begins running a program.

The closing of the ignition switch 2 also closes the monitor switch 21, and a voltage VM as shown by line C in FIG. 2 is supplied to the monitor signal generating circuit 20. Voltage VM causes transistors 23, 24, and 25 to turn on, so a monitor signal SM as shown by line D of FIG. 2 is output by the monitor signal generating circuit 20 from the emitter of transistor 24 and is provided to input port P1 of the microcomputer 8. The monitor signal SM rises in synchrony with the closing of the monitor switch 21 and falls a prescribed time TM thereafter. The prescribed time TM depends on a time constant determined by the values of resistors 30 and 32 and capacitor 31. When voltage VM is applied to the monitor signal generating circuit 20, while capacitor 31 is charging, a current flows through resistors 30 and 33, so a voltage is applied to the base of transistor 25, and transistor 25 is maintained in an on state. When the capacitor 31 has finished charging, current no longer flows through resistors 30 and 33, so transistor 25 is turned off, and the monitor signal SM falls to a low level.

The closing of the ignition switch 2 closes an unillustrated starter switch, and an unillustrated starter motor is driven to rotate the engine. An angle signal S1 as shown in line E of FIG. 2 which is generated in synchrony with the rotation of the engine is sensed by the pickup 6. The angle signal S1 is supplied to the waveform shaping circuit 11 and undergoes waveform shaping, and a processed signal S2 as shown in line F of FIG. 2 is output by the waveform shaping circuit 11 to input port P2 of the microcomputer 8.

Upon the rising of the reset signal RES, the microcomputer 8 determines whether the monitor signal SM is currently at a high level. If it is at a high level, a signal S3 as shown in line G of FIG. 2 is output from output port P3 and supplied to the base of the drive transistor 9. The drive transistor 9 is turned on when signal S3 has a high level and turns off when signal S3 has a low level. The power transistor 10 turns off when the drive transistor 9 turns on, and it turns on when the drive transistor 9 turns off. As a result, a voltage V1 as shown by line H of FIG. 2 which is synchronous with signal S3 is generated at the collector of the power transistor 10, i.e., on the primary side of the ignition coil 4. Upon the rising of voltage V1, i.e., when the current flowing through the primary winding of the ignition coil 4 is cut off, a high voltage is generated in the secondary winding of the ignition coil 4, and the spark plug 5 is thereby ignited.

Next, the operation of this embodiment will be described for the situation in which someone attempts to start the engine by short circuiting switches 2 and 21. The operation will first be explained with respect to FIG. 3 for the case in which the ignition switch 2 is first short circuited and then the monitor switch 21 is short circuited. The length of time required to short circuit the monitor switch 21 after short circuiting the ignition switch 2 will be denoted as T1 and can be easily determined empirically. A prescribed time TR after the ignition switch 2 is short circuited, the RES signal is generated, and the microcomputer 8 then determines whether the monitor signal SM has a high level. TR is preferably selected to be smaller than T1. Since the monitor switch 21 has yet to be short circuited, the monitor signal SM still has a low level, so the microcomputer 8 generates a high level signal S3 at output port P3 as shown by line G of FIG. 3. Signal S3 is supplied to the base of the drive transistor 9, which is thereby maintained in an on state. As a result, the power transistor 10 is maintained in an off state, and a voltage V1 as shown by line H of FIG. 3 is generated at its collector. This voltage V1 is applied to the primary winding of the ignition coil 4, so a high voltage is not generated in the secondary winding, and the spark plug 5 is not ignited. Therefore, the engine does not start, and theft of the vehicle is prevented.

The case in which the monitor switch 21 is short circuited before the ignition switch 2 will next be explained while referring to the waveform diagram of FIG. 4. The shorting of the monitor switch 21 supplies a voltage VM as shown by line C of FIG. 4 to the monitor signal generating circuit 20. When the ignition switch 2 is short circuited after elapse of time T1 from the shorting of the monitor switch 21, a voltage VB as shown in line A is supplied to the power supply circuit 7 and the monitor signal generating circuit 20. The monitor signal SM is generated in synchrony with the rise in the voltage VB, and it falls when prescribed time TM has passed from the rise in voltage VM and before the reset signal RES has been generated. TM and TR are chosen so as to satisfy the inequality TM−TR>T1. When the reset signal RES is generated, the microcomputer 8 determines whether the monitor signal SM has a high level. In this case, the monitor signal SM has already returned to a low level, so a high level signal S3 as shown by line G of FIG. 4 is output from the output port P3. As a result, in the same manner as described with respect to FIG. 3, a voltage V1 is applied to the primary winding of the ignition coil 4 by the power transistor 10, and the spark plug 5 is not ignited. Therefore, the engine can not be started, and theft of the vehicle is prevented.

The voltage VM applied to the monitor signal generating circuit 20 is smaller than an upper limit VH determined by battery voltage VB and the values of resistors 26 and 27. At the same time, it is higher than a lower limit VL determined by the values of resistors 30, 32, and 33. Namely, resistors 22 and 35 are chosen such that VH>VM>VL. If a large voltage higher than the upper limit VH, such as voltage VB, is simultaneously applied to the input terminals of the monitor signal generator circuit 20, transistor 23 and transistor 24 are both turned off, so the monitor signal SM is not generated, and the engine can not be started. Furthermore, if a voltage below the lower limit voltage VL is applied to the input terminals of the monitor signal generating circuit 20, such as when the input terminals are grounded, transistors 24 and 25 are turned off, so the monitor signal SM is not generated, and the engine can not be started.

Thus, the monitor signal SM is generated only when the time difference between the closing (or short circuiting) of the ignition switch 2 and the closing (or short circuiting) of the monitor switch 21 is in a prescribed range and the voltage VM is within a prescribed voltage range, and at other times the engine can not be started. Therefore, theft of the vehicle by hot wiring can be substantially prevented.

In the embodiment of FIG. 1, the reset signal RES is generated whenever the battery voltage VB rises above a predetermined threshold. Normally, the reset signal RES is generated only when the ignition switch 2 is initially closed to start the engine. However, during operation of the engine, it is possible for the battery voltage to momentarily fall below and then again rise above the threshold, causing the reset signal RES to be generated. At this time, in the embodiment of FIG. 1, the monitor signal SM has a low level, so a high level signal S3 is generated at the output port P3 of the microcomputer 8. The high level of signal S3 stops ignition, and this condition continues even if the reset signal RES is cleared. Accordingly, it becomes necessary to turn the ignition switch 2 off and then turn it back on again in order to restart the engine.

Figure 5:
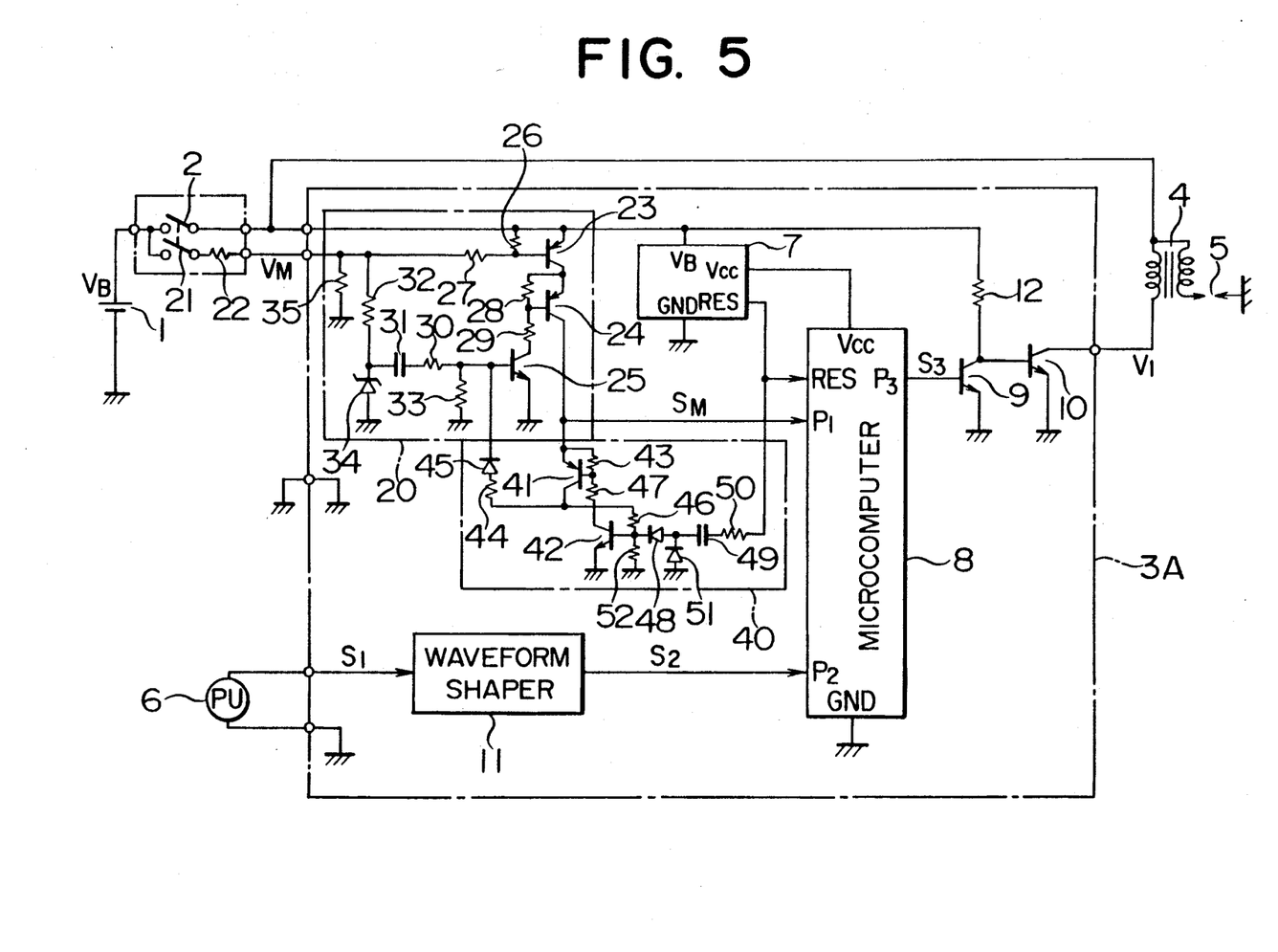
FIG. 5 is a circuit diagram of another embodiment of the present invention.

This problem is overcome by a second embodiment of the present invention, which is schematically illustrated in FIG. 5. This embodiment is similar to the embodiment of FIG. 1 and includes a control unit 3A for controlling an ignition coil 4. The structure of the control unit 3A is similar to that of control unit 3 of FIG. 1, but it further comprises a holding circuit 40. The purpose of the holding circuit 40, which includes elements numbers 41–52, is to maintain the monitor signal SM at a high level if the ignition switch 2 and the monitor switch 21 are closed substantially simultaneously but to have no effect on the monitor signal SM if switches 2 and 21 are closed sequentially, such as when someone attempts to hot-wire the engine. The emitter of a transistor 41 is connected to the collector of transistor 24 of the monitor signal generator circuit 20 and to input port P1 of the microcomputer 8. The emitter is also connected to the base of transistor 41 through a resistor 43. The collector of transistor 41 is connected to the base of transistor 25 of the monitor signal generating circuit 20 through a resistor 44 and a diode 45. The collector of another transistor 42 is connected to the base of transistor 41 through a resistor 47. The emitter of transistor 42 is grounded, and its base is connected to the power supply circuit 7 and to the reset terminal of the microcomputer 8 through a diode 48 and a differentiating circuit comprising a capacitor 49 and a resistor 50. The anode of the diode 48 is connected to the capacitor 49 and the cathode is connected to the base of transistor 42. A diode 51 is connected between the junction of diode 48 and capacitor 49 and ground, and a resistor 52 is connected between the base of transistor 42 and ground.

Figure 6:
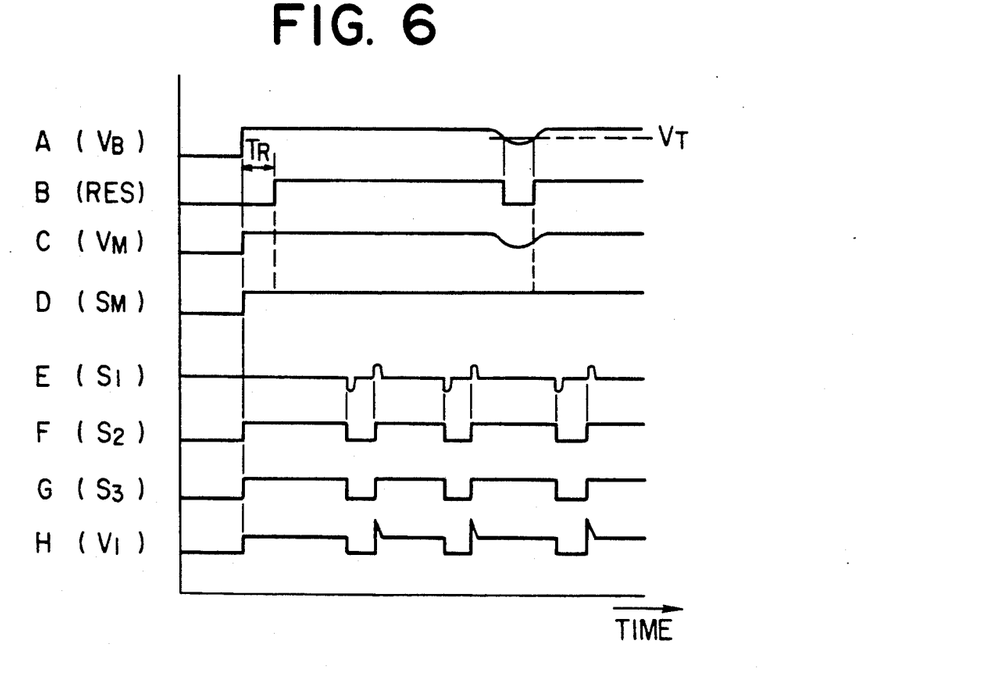
FIGS. 6 and 7 are waveform diagrams illustrating the operation of the embodiment of FIG. 5.

The operation of the embodiment of FIG. 5 will now be described while referring to FIGS. 6 and 7. FIG. 6 is a waveform diagram for the operation when the ignition switch 2 is closed in the normal manner by use of a key. When the ignition switch 2 is closed, the battery voltage VB, shown by line A of FIG. 6, is supplied to the power supply circuit 7 and to the collector of the drive transistor 9 through resistor 12. The battery voltage VB is also supplied to the emitter of transistor 23 of the monitor signal generating circuit 20. The power supply circuit 7 supplies a constant voltage VCC to the microcomputer 8, and it also supplies the microcomputer 8 with a reset signal RES as shown by line B of FIG. 6 which rises a prescribed length of time TR after the rise of the battery voltage VB. The reset signal RES causes the microcomputer 8 to begin running a program.

The closing of the ignition switch 2 also closes the monitor switch 21, and a voltage VM as shown by line C in FIG. 6 is supplied to the monitor signal generating circuit 20. Voltage VM turns on transistors 23, 24, and 25, so a monitor signal SM as shown by line D is output by the monitor signal generating circuit 20 from the emitter of transistor 24 and is provided to input port P1 of the microcomputer 8. The monitor signal SM rises at the same time as voltages VB and VM, but it does not fall a prescribed time TM after the rise of voltage VM as is the case with the FIG. 1 embodiment, as will now be described.

The reset signal RES is also supplied to the holding circuit 40. Because the monitor signal SM currently has a high level, transistors 41 and 42 of the holding circuit 40 are turned on by the reset signal RES. The output of the collector of transistor 41 is supplied to the base of transistor 25 through resistor 44 and diode 45. As a result, even when voltage stops being supplied to the base of transistor 25 via resistor 32, capacitor 31, and resistor 30, transistor 25 remains on due to the output of the holding circuit 40 and the monitor signal SM is maintained at a high level.

The closing of the ignition switch 2 closes an unillustrated starter switch, and an unillustrated starter motor is driven to rotate the engine. An angle signal S1 as shown in line E of FIG. 6 which is generated in synchrony with the rotation of the engine is sensed by the pickup 6. The angle signal S1 is supplied to the waveform shaping circuit 11 and undergoes waveform shaping, and a processed signal S2 as shown in line F of FIG. 6 is output by the waveform shaping circuit 11 to input port P2 of the microcomputer 8.

Upon the rising of the reset signal RES, the microcomputer 8 determines whether the monitor signal SM is currently at a high level. If it is at a high level, a signal S3 as shown in line G of FIG. 6 is output from output port P3 and supplied to the base of the drive transistor 9. The drive transistor 9 is turned on when signal S3 has a high level and turns off when signal S3 has a low level, and the power transistor 10 turns off when the drive transistor 9 turns on, and it turns on when the drive transistor 9 turns off. As a result, a voltage V1 as shown by line H of FIG. 6 which is synchronous with signal S3 is generated at the collector of the power transistor 10, i.e., on the primary side of the ignition coil 4. Upon the rising of voltage signal V1, i.e., when the current flowing through the primary winding of the ignition coil 4 is cut off, a high voltage is generated in the secondary winding of the ignition coil 4, and the spark plug 5 is thereby ignited.

After the engine has started, if the battery voltage VB should temporarily dip below and then rise above a prescribed threshold voltage VT as shown on the right side of line A of FIG. 6, the power supply circuit 7 will generate a reset signal RES as shown on the right side of line B. In the absence of the holding circuit 40, the monitor signal SM would have a low level, as described with respect to FIG. 3, the microcomputer 8 would maintain the switching signal S3 at a high level, regardless of the level of input signal S2, and ignition could not take place. However, in the present embodiment, the holding circuit 40 maintains the monitor signal SM at a high level, so the level of the switching signal S3 is varied in accordance with signal S2 just as before the temporary dip in the battery voltage VB, and normal ignition continues.

Next, the operation of this embodiment will be described for the situation in which someone attempts to start the engine by short circuiting switches 2 and 21. FIG. 7 illustrates the case in which the ignition switch 2 is short circuited a period of time T1 before the monitor switch 21. A prescribed time TR after the ignition switch 2 is short circuited, the reset signal RES is provided to the microcomputer 8, and the microcomputer 8 then determines whether the monitor signal SM has a high level. As mentioned earlier, TR is chosen to be smaller than the estimated length of time T1, so the monitor switch 21 has yet to be short circuited, and thus the monitor signal SM still has a low level. Therefore, the output signal S3 at output port P3 of the microcomputer 8 has a high level as shown by line G of FIG. 7.

Signal S3 is supplied to the base of the drive transistor 9, which is thereby maintained in an on state. As a result, the power transistor 10 is maintained in an off state, and a voltage V1 as shown by line H of FIG. 7 is generated at its collector. This voltage is applied to the primary winding of the ignition coil 4, so a high voltage is not generated in the secondary winding, and the spark plug 5 is not ignited. Therefore, the engine does not start, and theft of the vehicle is prevented.

The reset signal RES is also applied to transistor 42 of the holding circuit 40, and transistor 42 is turned on while capacitor 49 is charging. However, at the time that transistor 42 is turned on, the monitor signal SM has a low level. Therefore, no current flows through transistor 41, and the holding circuit 40 does not generate a voltage which can turn on transistor 25 of the monitor signal generating circuit 20.

Figure 7:
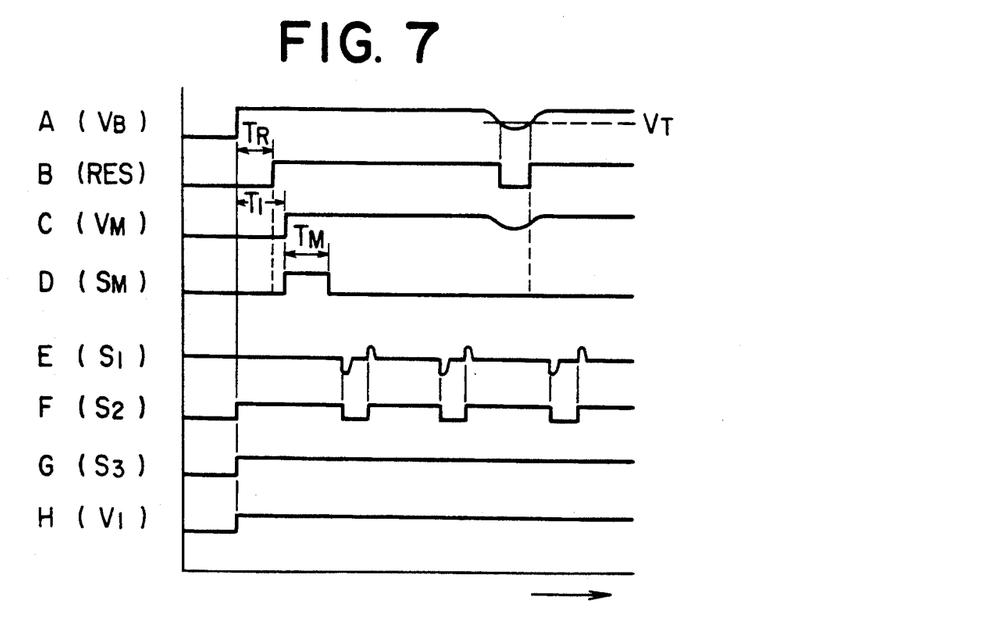

When the monitor switch 21 is short circuited, the monitor signal SM goes to a high level as shown by line D of FIG. 7. However, by this time, because of capacitor 49, transistor 42 is no longer conducting, so no current flows through transistor 41, and the holding circuit 40 does not generate a voltage which can maintain transistor 25 in an on state. Therefore, the monitor signal SM returns to a low level after a prescribed period TM.

Subsequently, if the battery voltage VB should temporarily dip below and then rise above the threshold voltage VT as shown on the right side of line A of FIG. 7, the power supply circuit 7 will generate a reset signal RES as shown on the right side of line B. Upon the rising edge of the reset signal, the microcomputer 8 determines whether the monitor signal SM has a high level. Since the monitor signal SM is low, as described above, the microcomputer 8 maintains the switching signal S3 at a high level, and ignition of the engine can not take place. Therefore, theft of the vehicle is prevented.

The operation of this embodiment when the monitor switch 21 is short circuited before the ignition switch 2 is similar to that described above. Namely, the holding circuit 40 has no effect on the monitor signal SM. Therefore, even if there is a momentary drop in the battery voltage VB, the engine will remain off.

The holding circuit 40 is not restricted to the structure illustrated in FIG. 5. For example, transistors 41 and 42 could be replaced by a single thyristor.

What is claimed is:

1. An ignition control apparatus for an engine comprising:
    an ignition switch;
    a monitor switch coupled to the ignition switch for switching movement therewith;
    an ignition coil;
    reset signal generating means for generating a reset signal in response to closing of the ignition switch;
    monitor signal generating means for generating a monitor signal in response to closing of the monitor switch; and
    control means responsive to the reset signal and the monitor signal for enabling the ignition coil to fire a spark plug only if the monitor signal has a prescribed level when the reset signal is generated.

2. A control apparatus as claimed in claim 1 wherein:
    the monitor signal generating means generates the monitor signal substantially simultaneously with closing of the monitor switch; and the reset signal generating means generates the reset signal a prescribed length of time TR after closing of the ignition signal.

3. A control apparatus as claimed in claim 2 wherein TR is shorter than the length of time T1 required to sequentially short circuit the ignition switch and the monitor switch.

4. A control apparatus as claimed in claim 2 wherein the monitor signal generating means generates the monitor signal for at most a period TM from the closing of the monitor switch, wherein TR>TM−T1 and T1 is the length of time required to sequentially short circuit the ignition switch and the monitor switch.

5. A control apparatus as claimed in claim 1 further comprising holding means for maintaining the monitor signal at the prescribed level.

6. An ignition control apparatus for an engine comprising:
- an ignition switch;
- a monitor switch;
- an ignition coil; and
- control means connected to the ignition switch, the monitor switch, and the ignition coil for allowing the ignition coil to ignite a spark plug only when the ignition switch and the monitor switch are closed substantially simultaneously.

* * * * *